(12) United States Patent
Eronen et al.

(10) Patent No.: US 11,099,802 B2
(45) Date of Patent: Aug. 24, 2021

(54) VIRTUAL REALITY

(71) Applicant: Nokia Technologies Oy, Espoo (FI)

(72) Inventors: Antti Johannes Eronen, Tampere (FI); Jussi Artturi Leppänen, Tampere (FI); Arto Juhani Lehtiniemi, Lempaala (FI); Miikka Tapani Vilermo, Siuro (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/847,856

(22) Filed: Apr. 14, 2020

(65) Prior Publication Data
US 2020/0326902 A1 Oct. 15, 2020

(30) Foreign Application Priority Data

Apr. 15, 2019 (EP) .................................... 19169357

(51) Int. Cl.
*G06F 3/14* (2006.01)
*G06F 3/01* (2006.01)
*G06F 3/16* (2006.01)

(52) U.S. Cl.
CPC ............ *G06F 3/1454* (2013.01); *G06F 3/011* (2013.01); *G06F 3/165* (2013.01)

(58) Field of Classification Search
CPC ........ G06F 3/1454; G06F 3/011; G06F 3/012; G06F 3/165; G06F 3/167; A63F 13/85; A63F 13/86; A63F 13/87
USPC ........................................................ 345/156
See application file for complete search history.

(56) References Cited

U.S. PATENT DOCUMENTS

| 2013/0123019 A1* | 5/2013 | Sullivan ................ A63F 13/355 463/42 |
| 2014/0245146 A1* | 8/2014 | Roos ....................... G06T 17/00 715/716 |
| 2014/0274368 A1* | 9/2014 | Cotter ..................... A63F 13/87 463/31 |
| 2017/0068508 A1* | 3/2017 | Cricri ..................... G06F 3/011 |

(Continued)

FOREIGN PATENT DOCUMENTS

| EP | 3264228 A1 | 1/2018 |
| EP | 3413166 A1 | 12/2018 |

OTHER PUBLICATIONS

Extended European Search Report received for corresponding European Patent Application No. 19169357.1, dated Sep. 30, 2019, 10 pages.

*Primary Examiner* — Tom V Sheng
(74) *Attorney, Agent, or Firm* — Alston & Bird LLP

(57) ABSTRACT

An apparatus comprising means for:
enabling a first virtual reality (VR) user to control movement of a first virtual user in a virtual space, wherein the one or more non-VR users are represented in the virtual space by one or more, respective, separate virtual visual elements;
enabling selection in the virtual space of a virtual visual element representative of a non-VR user to select one of the one or more non-VR users;
newly creating two-way audio communication between the selected one of the one or more non-VR users and a second VR user by enabling audio from the second VR user to be rendered to at least the selected one of the one or more non-VR users and audio from at least the selected one of the one or more non-VR users to be newly rendered to the second VR user.

18 Claims, 8 Drawing Sheets

(56) References Cited

U.S. PATENT DOCUMENTS

Figure 1A:
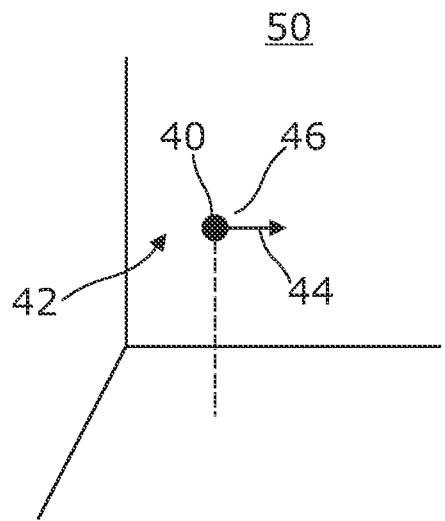

| | | | | |
|---|---|---|---|---|
| 2018/0285050 A1* | 10/2018 | McNabb | .................. | A63F 13/42 |
| 2019/0018505 A1* | 1/2019 | Cherukuri | .............. | G09G 5/001 |
| 2019/0103899 A1* | 4/2019 | Lee | ....................... | G06F 1/1605 |
| 2019/0130644 A1* | 5/2019 | Mate | ..................... | G06T 19/006 |
| 2019/0138085 A1* | 5/2019 | Eronen | ............... | G06F 3/04815 |
| 2019/0314728 A1* | 10/2019 | Sullivan | .................. | A63F 13/87 |
| 2019/0335290 A1* | 10/2019 | Laaksonen | .............. | H04S 7/304 |
| 2020/0371737 A1* | 11/2020 | Leppanen | ............. | G06F 3/1454 |

* cited by examiner

VIRTUAL REALITY

TECHNOLOGICAL FIELD

Embodiments of the present disclosure relate to virtual reality (VR).

BACKGROUND

In virtual reality, a VR user is a user whose actions in real space, for example a user's point-of-view, control at least part of a virtual scene rendered to the VR user.

In at least some examples, the VR user is represented in the virtual space by a virtual user. The virtual user can be visible to the VR user and other users. The VR user can control movement of a virtual user in the virtual space.

Typically, the virtual scene is rendered to the VR user via a personal head mounted device. However, it may additionally or alternatively be rendered on a display viewed by other non-VR users. In this content, a non-VR user does not control a virtual user in the virtual space. The non-VR user is a spectator only.

BRIEF SUMMARY

According to various, but not necessarily all, embodiments there is provided an apparatus comprising means for:
  enabling a first virtual reality (VR) user and user of the apparatus to control movement of a first virtual user in a virtual space, wherein a first point-of-view of the first VR user in a real space controls at least part of a first virtual visual scene rendered to the first VR user and to one or more non-VR users, wherein the one or more non-VR users are represented in the virtual space by one or more, respective, separate virtual visual elements, wherein the one or more separate virtual visual elements move, as a group, in the virtual space with the first virtual user;
  enabling selection in the virtual space of a virtual visual element representative of a non-VR user to select one of the one or more non-VR users;
  newly creating two-way audio communication between the selected one of the one or more non-VR users and a second VR user by enabling audio from the second VR user to be rendered to at least the selected one of the one or more non-VR users and audio from at least the selected one of the one or more non-VR users to be newly rendered to the second VR user.

In some but not necessarily all examples, the apparatus comprises means for: enabling a second VR user to control movement of a second virtual user in the virtual space, wherein a second point-of-view of the second VR user in real space controls at least part of a second virtual visual scene rendered at least to the second VR user.

In some but not necessarily all examples, the apparatus comprises means for enabling two-way visual communication between the selected one of the one or more non-VR users and the second VR user by displaying a visual representation of the second VR user or second virtual user within a window within the first virtual visual scene, the first visual scene being controlled at least in part by a first point-of-view of the first VR user, and by displaying a visual representation of the selected non-VR user within a window within the second virtual visual scene, the second visual scene being controlled at least in part by a second point-of-view of the second VR user.

In some but not necessarily all examples, the one or more separate virtual visual elements are avatars of the respective one or more non-VR users and are visually distinct compared to virtual users.

In some but not necessarily all examples, selection in the virtual space of the virtual visual element representative of a non-VR user switches a mode of the apparatus from a first mode to the second mode, wherein in the first mode, audio from the one or more non-VR users is not rendered to the second VR user.

In some but not necessarily all examples, the apparatus comprises means for, in the first mode, enabling: audio from the first VR user to be rendered to the second VR user; and audio from the second VR user to be rendered to the first VR user and to be rendered to the one or more non-VR users.

In some but not necessarily all examples, the apparatus comprises means for enabling in the first mode two-way audio communication between the first VR user and the second VR user while preventing audio communication from any of the one of the one or more non-VR users to the second VR user.

In some but not necessarily all examples, in a first mode, the first VR user and/or second VR user can control one or more of:
  whether or not audio from the second VR user is rendered to the first VR user and/or
  whether or not audio from the second VR user is rendered to the one or more non-VR users and/or
  whether or not audio from the first VR user is rendered to the second VR user and/or
  whether or not audio from the first VR user is rendered to the one or more non-VR users and/or
  whether or not audio from the one or more non-VR users is rendered to the first VR user.

In some but not necessarily all examples, in a second mode, first VR user and/or second VR user can control one or more of:
  whether or not audio from the second VR user is rendered to the first VR user and/or
  whether or not audio from the second VR user is rendered to the one or more non-VR users that are not a selected non-VR user and/or
  whether or not audio from the first VR user is rendered to the second VR user and/or
  whether or not audio from the first VR user is rendered to the one or more non-VR users and/or
  whether or not audio from the one or more non-VR users is rendered to the first VR user.

In some but not necessarily all examples, the apparatus comprises means for enabling the second virtual user to move towards or move close to, in the rendered second virtual visual scene, a virtual visual element representative of a non-VR user as a necessary but not necessarily sufficient condition for selecting the non-VR user.

In some but not necessarily all examples, audio from the second VR user is rendered to the first VR user via a head mounted device and is rendered to the one or more non-VR users differently and audio from the first VR user is rendered to the second VR user via a HMD and is rendered to the one or more non-VR users differently.

In some but not necessarily all examples, audio from the second VR user is rendered to the first VR user via a head mounted device and is rendered to the one or more non-VR users by broadcast via one or more loudspeakers in a real space shared by the first VR user and the one or more non-VR users.

In some but not necessarily all examples, each non-VR user does not control a virtual user in the virtual space and wherein the one or more separate virtual visual elements are not moveable in the virtual space by the respective one or more non-VR users.

According to various, but not necessarily all, embodiments there is provided a method comprising:
  enabling a first VR user and user of the apparatus to control movement of a first virtual user in a virtual space, wherein
  a first point-of-view of the first VR user in a real space controls at least part of a first virtual visual scene rendered to the first VR user and to one or more non-VR users
  wherein the one or more non-VR users are represented in the virtual space by one or more,
  respective, separate virtual visual elements, wherein the one or more separate virtual visual elements move, as a group, in the virtual space with the first virtual user,
  enabling selection in the virtual space of a virtual visual element representative of a non-VR user to select one of the one or more non-VR users;
  newly creating two-way audio communication between the selected one of the one or more non-VR users and a second VR user by enabling audio from the second VR user to be rendered to at least the selected one of the one or more non-VR users and
  audio from at least the selected one of the one or more non-VR users to be newly rendered to the second VR user.

According to various, but not necessarily all, embodiments there is provided a computer program comprising program instructions for causing an apparatus to perform at least the following:
  enabling a first VR user and user of the apparatus to control movement of a first virtual user in a virtual space, wherein
  a first point-of-view of the first VR user in a real space controls at least part of a first virtual visual scene rendered to the first VR user and to one or more non-VR users
  wherein the one or more non-VR users are represented in the virtual space by one or more,
  respective, separate virtual visual elements, wherein the one or more separate virtual visual elements move, as a group, in the virtual space with the first virtual user,
  enabling selection in the virtual space of a virtual visual element representative of a non-VR user to select one of the one or more non-VR users;
  newly creating two-way audio communication between the selected one of the one or more non-VR users and a second VR user by enabling audio from the second VR user to be rendered to at least the selected one of the one or more non-VR users and
  audio from at least the selected one of the one or more non-VR users to be newly rendered to the second VR user.

According to various, but not necessarily all, embodiments there is provided examples as claimed in the appended claims.

BRIEF DESCRIPTION

Figure 2:
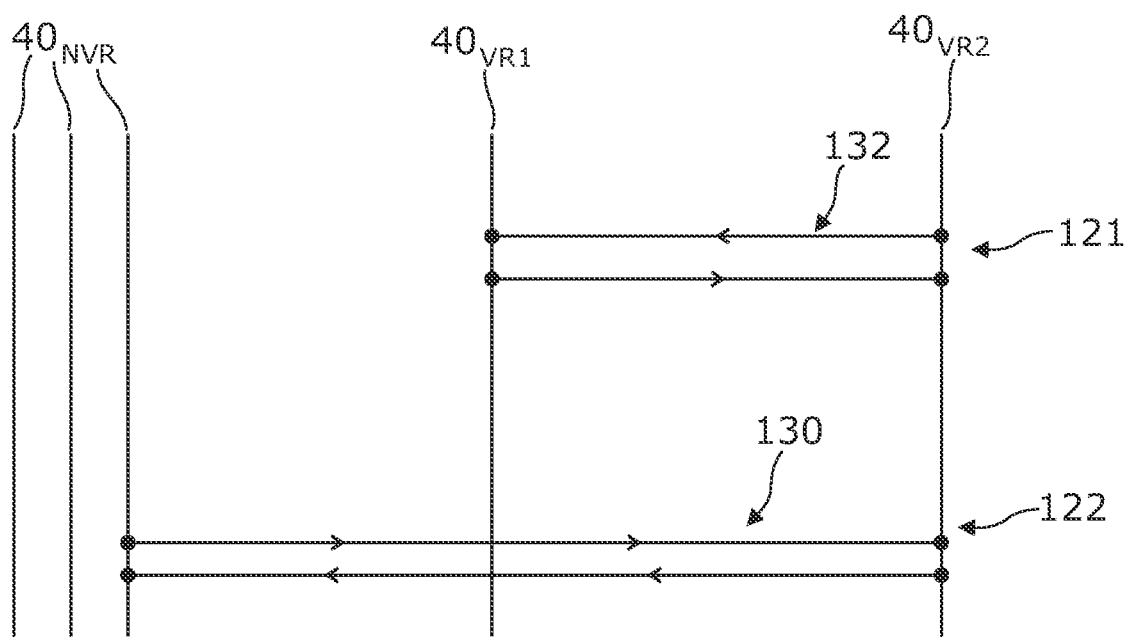
Figure 3A:
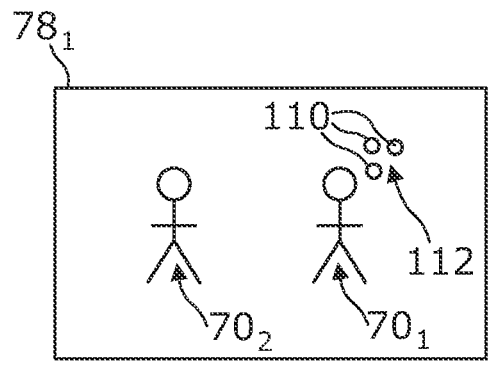
Figure 3B:
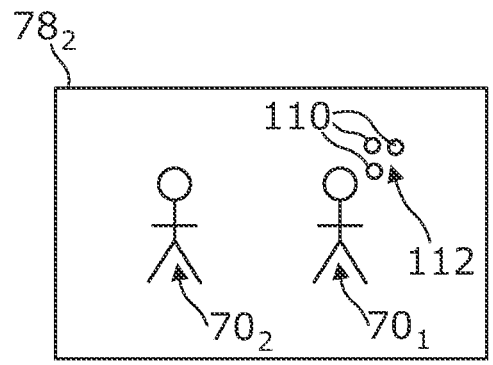
Figure 4A:
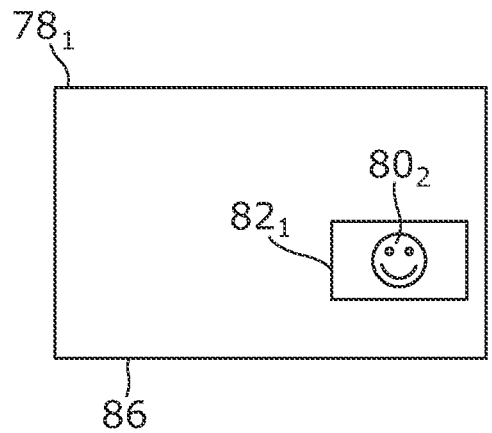
Figure 4B:
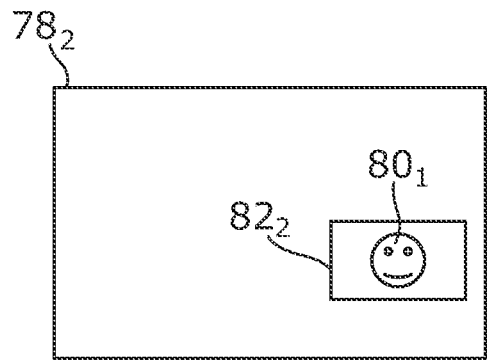
Figure 5:
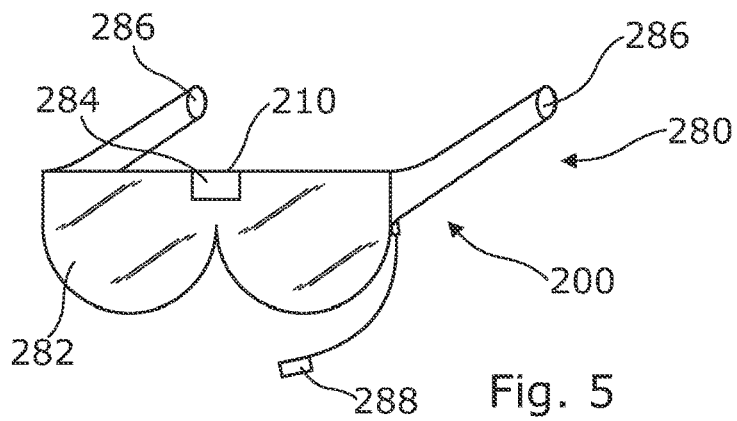
Figure 6:
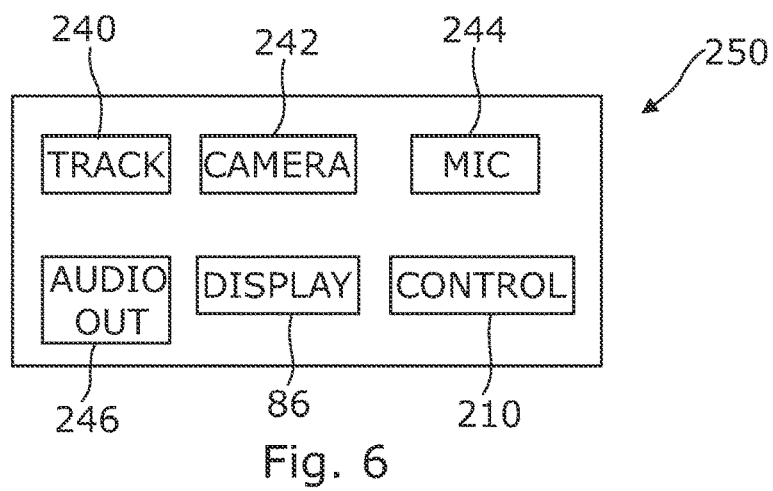
Figure 7A:
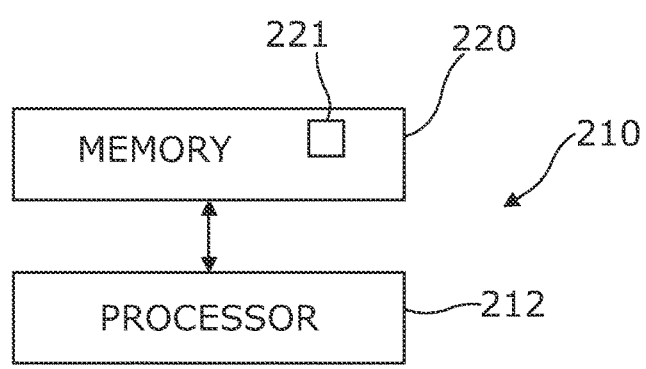
Figure 7B:
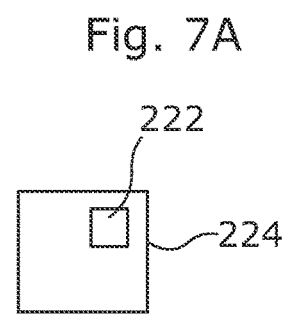

Some example embodiments will now be described with reference to the accompanying drawings in which:
FIGS. 1A, 1B, 1C, 1D show an example embodiment of the subject matter described herein;
FIG. 2 shows another example embodiment of the subject matter described herein;
FIG. 3A, 3B show an example embodiment of the subject matter described herein;
FIG. 4A, 4B show another example embodiment of the subject matter described herein;
FIG. 5 shows an example embodiment of the subject matter described herein;
FIG. 6 shows another example embodiment of the subject matter described herein;
FIG. 7A shows an example embodiment of the subject matter described herein;
FIG. 7B shows another example embodiment of the subject matter described herein;
FIGS. 8A to 8E show an example embodiment of the subject matter described herein.

DEFINITIONS

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view (position) within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view (position) within the sound space.

"sound object" refers to a sound source that may be located within the sound space. A source sound object represents a sound source within the sound space, in contrast to a sound source associated with an object in the virtual visual space. A recorded sound object represents sounds recorded at a particular microphone or location. A rendered sound object represents sounds rendered from a particular location.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an augmented virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view (position) within the real space.

"real visual scene" refers to a visual representation of the real space viewed from a particular real point of view (position) within the real space.

"mediated reality" in this document refers to a user experiencing, for example visually and/or aurally, a fully or partially artificial environment (a virtual space) as a virtual scene at least partially rendered by an apparatus to a user. The virtual scene is determined by a point of view (virtual position) within the virtual space. Displaying the virtual scene means providing a virtual visual scene in a form that can be perceived by the user.

"augmented reality" in this document refers to a form of mediated reality in which a user experiences a partially artificial environment (a virtual space) as a virtual scene comprising a real scene, for example a real visual scene, of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more augmented virtual objects.

"mediated reality content" is virtual content which enables a user to experience, for example visually and/or aurally, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually and/or aurally, a partially artificial environment (a virtual space) as a virtual scene. Augmented reality content could include interactive content such as a video game or non-interactive content such as motion video.

"virtual reality content" is a form of mediated reality content which enables a user to experience, for example visually and/or aurally, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point of view (virtual position) within the virtual space, changing the virtual scene;

"first person perspective-mediated" as applied to mediated reality, augmented reality or virtual reality means perspective mediated with the additional constraint that the user's real point of view (location and/or orientation) determines the point of view (virtual position) within the virtual space of a virtual user;

"third person perspective-mediated" as applied to mediated reality, augmented reality or virtual reality means perspective mediated with the additional constraint that the user's real point of view does not determine the point of view (virtual position) within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

"virtual user" defines the point of view (virtual position—location and/or orientation) in virtual space used to generate a perspective-mediated sound scene and/or visual scene. A virtual user may be a notional listener and/or a notional viewer.

"notional listener" defines the point of view (virtual position—location and/or orientation) in virtual space used to generate a perspective-mediated sound scene, irrespective of whether or not a user is actually listening "notional viewer" defines the point of view (virtual position—location and/or orientation) in virtual space used to generate a perspective-mediated visual scene, irrespective of whether or not a user is actually viewing.

Three degrees of freedom (3DoF) describes mediated reality where the virtual position is determined by orientation only (e.g. the three degrees of three-dimensional orientation). An example of three degrees of three-dimensional orientation is pitch, roll and yaw. In relation to first person perspective-mediated reality 3DoF, only the user's orientation determines the virtual position.

Six degrees of freedom (6DoF) describes mediated reality where the virtual position is determined by both orientation (e.g. the three degrees of three-dimensional orientation) and location (e.g. the three degrees of three-dimensional location). An example of three degrees of three-dimensional orientation is pitch, roll and yaw. An example of three degrees of three-dimensional location is a three-dimensional coordinate in a Euclidian space spanned by orthogonal axes such as left-to-right (x), front to back (y) and down to up (z) axes. In relation to first person perspective-mediated reality 6DoF, both the user's orientation and the user's location in the real space determine the virtual position. In relation to third person perspective-mediated reality 6DoF, the user's location in the real space does not determine the virtual position. The user's orientation in the real space may or may not determine the virtual position.

Three degrees of freedom 'plus' (3DoF+) describes an example of six degrees of freedom where a change in location (e.g. the three degrees of three-dimensional location) is a change in location relative to the user that can arise from a postural change of a user's head and/or body and does not involve a translation of the user through real space by, for example, walking.

"spatial audio" is the rendering of a sound scene. "First person perspective spatial audio" or "immersive audio" is spatial audio where the user's point of view determines the sound scene so that audio content selected by a current point-of-view of the user is rendered to the user.

DETAILED DESCRIPTION

FIGS. 1A, 1B, 1C, 1D, illustrate first person perspective mediated reality. In this context, mediated reality means the rendering of mediated reality for the purposes of achieving mediated reality for a user, for example augmented reality or virtual reality. It may or may not be user interactive. The mediated reality may support one or more of: 3DoF, 3DoF+ or 6DoF.

Figure 1C:
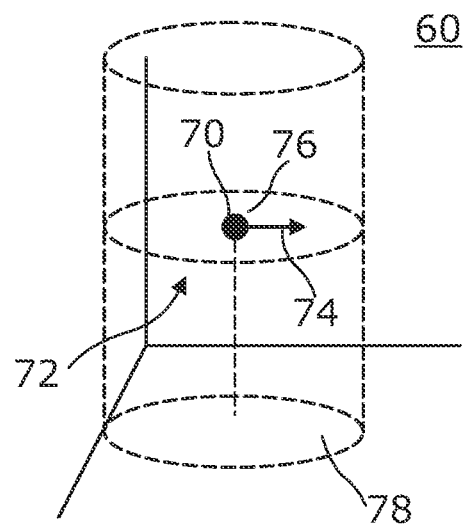

FIGS. 1A, 1C illustrate at a first time a real space 50 and a virtual space 60. A user 40 in the real space 50 has a point of view (a position) 42 defined by a location 46 and an orientation 44. The location is a three-dimensional location and the orientation is a three-dimensional orientation.

In an example of 3DoF mediated reality, the user's real point-of-view 42 (orientation) determines the point-of-view 72 (virtual position) within the virtual space 60 of a virtual user 70. An orientation 44 of the user 40 controls a virtual orientation 74 of a virtual user 70. There is a correspondence between the orientation 44 and the virtual orientation 74 such that a change in the orientation 44 produces the same change in the virtual orientation 74.

The virtual orientation 74 of the virtual user 70 in combination with a virtual field of view defines a virtual (visual) scene 78. The virtual orientation 74 of the virtual user 70 in combination with a virtual field of hearing defines a virtual (sound) scene 78.

A virtual scene 78 is that part of the virtual space 60 that is rendered to a user. In 3DoF mediated reality, a change in the location 46 of the user 40 does not change the virtual location 76 or virtual orientation 74 of the virtual user 70.

In the example of 6DoF mediated reality, the user's real point-of-view 42 (location 46 and/or orientation 44) determines the point-of-view 72 (virtual position) within the virtual space 60 of a virtual user 70. The situation is as described for 3DoF and in addition it is possible to change the rendered virtual scene 78 by movement of a location 46 of the user 40. For example, there may be a mapping between the location 46 of the user 40 and the virtual location 76 of the virtual user 70. A change in the location 46 of the user 40 produces a corresponding change in the virtual location 76 of the virtual user 70. A change in the virtual location 76 of the virtual user 70 changes the rendered virtual scene 78.

Figure 1B:
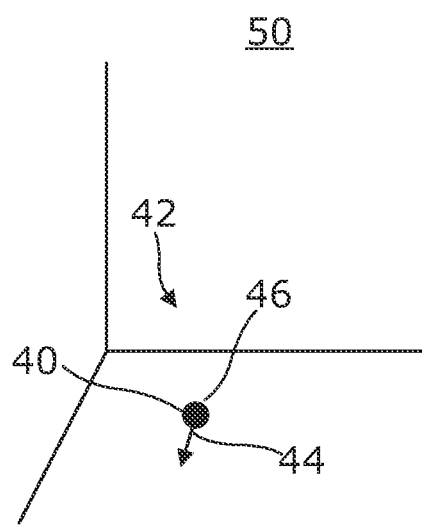
Figure 1D:
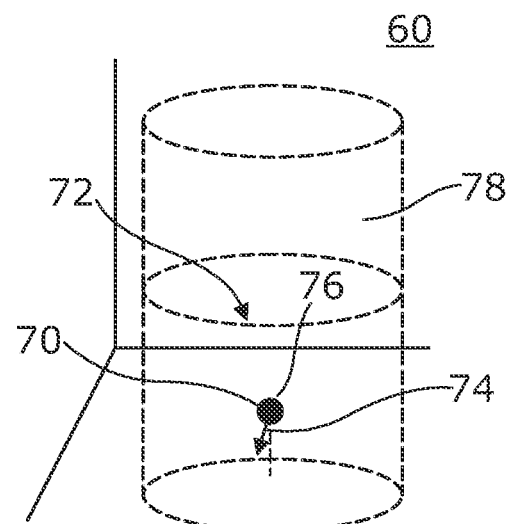

This may be appreciated from FIGS. 1B, 1D which illustrate the consequences of a change in location 46 and orientation 44 of the user 40 on the rendered virtual scene 78 (FIG. 1D). The change in location may arise from a postural change of the user and/or a translation of the user by walking or otherwise.

First person perspective mediated reality may control a virtual scene 78. A virtual scene 78 can be only a virtual sound scene 78, only a virtual visual scene 78 or a combination of both a virtual sound scene and virtual visual scene, depending upon implementation.

In some situations, for example when the virtual sound scene 78 is rendered to a listener through a head-mounted audio output device, for example headphones using binaural audio coding, it may be desirable for the rendered virtual (sound) space 60 to remain fixed in real space when the listener turns their head in space. This means that the rendered virtual (sound) space 60 needs to be rotated relative to the audio output device by the same amount in the opposite sense to the head rotation. The orientation of the portion of the rendered sound space tracks with the rotation of the listener's head so that the orientation of the rendered sound space remains fixed in space and does not move with the listener's head.

A sound 'locked' to the real world may be referred to as a diegetic sound.

A sound 'locked' to the user's head may be referred to as a non-diegetic sound.

The rendering of a virtual sound scene 78 may also be described as providing spatial audio or providing immersive audio.

In at least some examples, the virtual (sound) space 60 defined by audio content comprises one or more sound sources at different positions in the virtual (sound) space 60. The audio rendered to the user depends upon the relative position of the virtual user 70 from the positions of the sound sources. Perspective mediated virtual reality, for example first person perspective mediated reality enables the user 40 to change the position of the virtual user 70 within the virtual (sound) space 60 thereby changing the positions of the sound sources relative to the virtual user which changes the virtual (sound) scene 78 rendered to the user 40.

Channel-based audio, for example, n,m surround sound (e.g. 5.1, 7.1 or 22.2 surround sound) or binaural audio, can be used or scene-based audio, including spatial information about a sound field and sound sources, can be used.

Audio content may encode spatial audio as audio objects. Examples include but are not limited to MPEG-4 and MPEG SAOC. MPEG SAOC is an example of metadata-assisted spatial audio.

Audio content may encode spatial audio as audio objects in the form of moving virtual loudspeakers.

Audio content may encode spatial audio as audio signals with parametric side information or metadata. The audio signals can be, for example, Directional Audio Coding (DirAC) or Nokia's spatial audio capture OZO Audio. For such audio signals, synthesis which utilizes the audio signals and the parametric metadata is used to synthesize the audio scene so that a desired spatial perception is created.

The audio signals can be, for example, First Order Ambisonics (FOA) or its special case B-format, Higher Order Ambisonics (HOA) signals or mid-side stereo.

The parametric metadata may be produced by different techniques. For example, Nokia's spatial audio capture (OZO Audio) or Directional Audio Coding (DirAC) can be used. Both capture a sound field and represent it using parametric metadata. The parametric metadata may for example comprise: direction parameters that indicate direction per frequency band; distance parameters that indicate distance per frequency band; energy-split parameters that indicate direct-to-total energy ratio or diffuse-to-total energy ratio per frequency band. Each time-frequency tile may be treated as a sound source with the direction parameter controlling vector based amplitude panning for a direct version and the energy-split parameter controlling differential gain for an indirect (decorrelated) version.

The audio content encoded may be speech and/or music and/or generic audio.

3GPP IVAS (3GPP, Immersive Voice and Audio services), which currently under development, is expected to support new immersive voice and audio services, for example, mediated reality.

In some but not necessarily all examples amplitude panning techniques may be used to create or position a sound object. For example, the known method of vector-based amplitude panning (VBAP) can be used to position a sound source.

A sound object may be re-positioned by mixing a direct form of the object (an attenuated and directionally-filtered direct sound) with an indirect form of the object (e.g. positioned directional early reflections and/or diffuse reverberant).

In the following examples and FIGs, a first VR user $40_{VR1}$ is represented as a first virtual user $70_1$ in the virtual space 60. The first VR user $40_{VR1}$ controls movement of the first virtual user $70_1$ in the virtual space 60. A first point of view $42_1$ of the first VR user $40_1$ in a real space 50 controls at least part of a first virtual visual scene $78_1$ rendered to the first VR user $40_{VR1}$.

A second VR user $40_{VR2}$ is represented as a second virtual user $70_2$ in the virtual space 60. The second VR user $40_{VR2}$ controls movement of the second virtual user $70_2$ in the virtual space 60.

A second point of view $42_2$ of the second VR user $40_2$ in a real space 50 controls at least part of a second virtual visual scene $78_2$ rendered to the second VR user $40_{VR2}$.

The first VR user $40_{VR1}$ and the second VR user $40_{VR2}$ are different users. In this example they occupy different, separated portions of real space 50. The separated portions of real space 50 can be separated by any distance. The first point of view $42_1$ of the first VR user $40_1$ and the second point of view $42_2$ of the second VR user $40_2$ are independently variable. The first virtual visual scene $78_1$ varies independently of the second virtual visual scene $78_2$. The first virtual user $70_1$ is different to the second virtual user $70_2$.

There are one or more non-VR users $40_{NVR}$. Each non-VR user $40_{NVR}$ does not control a virtual user 70 in the virtual space 60. Non-VR users $40_{NVR}$ are represented in the virtual space 60 by virtual visual elements 110, that move in the virtual space 60 with an associated virtual user 70 in a group 112. The one or more separate virtual visual elements 110 are not moveable in the virtual space 60 by the respective one or more non-VR users $40_{NVR}$. A point-of-view of the non-VR user $40_{NVR}$ in a real space 50 does not control a virtual visual scene 78 rendered to any VR user $40_{VR}$ or non-VR user $40_{NVR}$. The virtual visual scene 78 rendered to the associated VR user $40_{VR}$ is rendered to the associated non-VR users $40_{NVR}$.

In the example illustrated, the one or more non-VR users $40_{NVR}$ are associated with the first VR user $40_{VR1}$. The non-VR users $40_{NVR}$ are represented in the virtual space 60 by virtual visual elements 110, that move in the virtual space 60 with the first virtual user $70_1$ in a group 112. The first virtual visual scene $78_1$ rendered to the first VR user $40_{VR1}$ is rendered to the associated non-VR users $40_{NVR}$.

In the example illustrated, for clarity of explanation, the one or more non-VR users $40_{NVR}$ are associated with only the first VR user $40_{VR1}$. There are no non-VR users $40_{NVR}$ associated with the second VR user $40_{VR2}$.

The one or more non-VR users $40_{NVR}$ associated with the first VR user $40_{VR1}$ can, in some examples, occupy the same portion of real space. For example, the first virtual visual scene $78_1$ rendered to the first VR user $40_{VR1}$ can be rendered to the non-VR users $40_{NVR}$ via a display 86 in the same room as the first VR user $40_{VR1}$.

The one or more non-VR users $40_{NVR}$ associated with the first VR user $40_{VR1}$ can, in some examples, be separated and occupy different portions of real space 50. For example, the first virtual visual scene $78_1$ rendered to the first VR user $40_{VR1}$ can be rendered to the non-VR users $40_{NVR}$ via a display in a different room, house, country than the first VR user $40_{VR1}$ or other non-VR users $40_{NVR}$.

FIG. 2 illustrates an example of a method 100 comprising: enabling a first virtual reality (VR) user $40_{VR1}$ to control movement of a first virtual user $70_1$ in a virtual space 60; and enabling a first point of view $42_1$ of the first VR user $40_{VR1}$ in a real space 50 to control at least part of a first virtual visual scene $78_1$ rendered to the first VR user $40_{VR1}$ and to one or more non-VR users $40_{NVR}$ (see FIG. 3A).

The one or more non-VR users $40_{NVR}$ are represented in the virtual space 60 by one or more, respective, separate virtual visual elements 110. The one or more separate virtual visual elements 110 move, as a group 112, in the virtual space 60 with the first virtual user $70_1$.

Depending upon implementation, the first virtual user $70_1$ and the associated virtual visual elements 110 can be included within the first virtual visual scene $78_1$ to provide a third party view (as illustrated in FIG. 3A). In other examples, the first virtual user $70_1$ and the associated virtual visual elements 110 are not included within the first virtual visual scene $78_1$ to provide a first party view. In some examples, the first VR user $40_{VR1}$ can control whether the third party or first party view is used.

The first virtual user $70_1$ and the associated virtual visual elements 110 can be included within the second virtual visual scene $78_2$ when the second point of view $42_2$ of the second VR user $40_{VR2}$ in real space 50 is correctly aligned (see FIG. 3B). The method 100 can also enable the second VR user $40_{VR2}$ to control movement of a second virtual user $70_2$ in the virtual space 60. A second point of view $42_2$ of the second VR user $40_{VR2}$ in real space 50 controls at least part of a second virtual visual scene $78_2$ rendered at least to the second VR user $40_{VR2}$ (see FIG. 3B).

The method 100 additionally comprises: enabling selection in the virtual space 60 of a virtual visual element 110 representative of a non-VR user $40_{NVR}$ to select one of the one or more non-VR users $40_{NVR}$.

The method 100 additionally comprises: newly creating two-way communication 130, for example comprising two-way audio communication, between the selected one of the one or more non-VR users $40_{NVR}$ and the second VR user $40_{VR2}$, in a second mode 122, by enabling audio from the second VR user $40_{VR2}$ to be rendered to at least the selected one of the one or more non-VR users $40_{NVR}$ and audio from at least the selected one of the one or more non-VR users $40_{NVR}$ to be newly rendered to the second VR user $40_{VR2}$.

In some but not necessarily all examples, the virtual visual element 110 can be a selectable element within the first virtual visual scene $78_1$ that is selectable by the first virtual user $70_1$ under the control of the first VR user $40_{VR1}$. The selection can occur as a result of any suitable interaction. For example, as a result of the first virtual user $70_1$ gazing at, or pointing at, or touching the virtual visual element 110.

Alternatively or in addition, in some but not necessarily all examples, the virtual visual element 110 can be a selectable element within the second virtual visual scene $78_2$ (because the first virtual user $70_1$ is also within the second virtual visual scene $78_2$) that is selectable by the second virtual user $70_2$ under the control of the second VR user $40_{VR2}$. The selection can occur as a result of any suitable interaction. For example, as a result of the second virtual user $70_2$ gazing at, or pointing at, or touching the virtual visual element 110. The second virtual user $70_2$ can be moved towards or moved close to, in the rendered second virtual visual scene $78_2$, a virtual visual element 110 representative of a non-VR user as a necessary but not necessarily sufficient condition for selecting the non-VR user.

In some but not necessarily all examples, the one or more separate virtual visual elements 110 are avatars of the respective one or more non-VR users $40_{NVR}$ and are visually distinct compared to virtual users 70.

In some but not necessarily all examples, the one or more separate virtual visual elements 110 are two-dimensional virtual visual elements 110 whereas the first virtual user $70_1$ and the second virtual user $70_2$ are three-dimensional virtual visual objects.

In some but not necessarily all examples, the one or more separate virtual visual elements 110 are generated from captured images of the respective one or more non-VR users $40_{NVR}$ and are visually distinct from virtual users 70.

In some but not necessarily all examples, during the second mode 122, the method 100 also enables two-way communication 130, comprising two-way visual communication between the selected one of the one or more non-VR users $40_{NVR}$ and the second VR user $40_{VR2}$. For example, as illustrated in FIG. 4A, a visual representation $80_2$ of the second VR user $40_{VR2}$ or second virtual user $70_2$ can be displayed within a window $82_1$ within the first virtual visual scene $78_1$, while the first virtual visual scene $78_1$ is being controlled at least in part by the first point of view $42_1$ of the first VR user $40_{VR1}$. Also, as illustrated in FIG. 4B, a visual representation $80_1$ of the selected non-VR user $40_{NVR}$ is displayed within a window $82_2$ within the second virtual visual scene $78_2$, while the second virtual visual scene $78_2$ is being controlled at least in part by a second point of view $42_2$ of the second VR user $40_{VR2}$.

In some but not necessarily all examples a position of the selected non-VR user $40_{NVR}$ relative to a display 86, displaying the first virtual visual scene $78_1$ and in-viewport window $82_1$, is tracked. Tracking can for example be achieved using a tracking sensors 240 (see FIG. 6).

There are many different technologies that may be used to position a user in real space. An example of a passive system, used in the Kinect™ device, is when an object is painted with a non-homogenous pattern of symbols using infrared light and the reflected light is measured using multiple cameras and then processed, using the parallax effect, to determine a position of the object.

In some but not necessarily all examples, the in-viewport window $82_1$, is positioned so that it is located on a side of the display 86 closest to the selected non-VR user $40_{NVR}$.

In some but not necessarily all examples, the in-viewport window $82_1$, moves so that it tracks the selected non-VR user $40_{NVR}$ and is located in the display 86 at a location closest to a current position of the selected non-VR user $40_{NVR}$.

In some but not necessarily all examples in-viewport window $82_1$, is displayed only in the viewport of the display 86, that is, in only the first virtual visual scene $78_1$ displayed to the selected non-VR user $40_{NVR}$. In this example, the in-viewport window $82_1$, is not displayed in a viewport of a head mounted device 280 used by the first VR user $40_{VR1}$, that is, it is not displayed in the first virtual visual scene $78_1$ displayed to the first VR user $40_1$.

The method 100 illustrated in FIG. 2 comprises switching from a first mode 121 to the second mode 122 in response to selection in the virtual space 60 of the virtual visual element 110 representative of a non-VR user $20_{NVR}$.

In the second mode 122, audio from the one or more non-VR users $40_{NVR}$ is rendered to the second VR user $40_{VR2}$, however, in the first mode 121, audio from the one or more non-VR users $40_{NVR}$ is not to be rendered to the second VR user $40_{VR2}$. Therefore, selection in the virtual space 60 of the virtual visual element 110 representative of a non-VR user $40_{NVR}$ causes, at least, audio from the selected one or more non-VR users $40_{NVR}$ to be rendered to the second VR user $40_{VR2}$.

Various different communication scenarios are possible for the first mode 121, including no audio communication.

In some but not necessarily all examples, in the first mode 121, the method 100 enables:
 i) audio from the first VR user $40_{VR1}$ to be rendered to the second VR user $40_{VR2}$; and
 ii) audio from the second VR user $40_{VR2}$ to be rendered to the first VR user $40_{VR1}$.

This enables two-way audio communication 132 between the first VR user $40_{VR1}$ and the second VR user $40_{VR2}$. The two-way audio communication 132 can occur while preventing audio communication from any of the one of the one or more non-VR users $40_{NVR}$ to the second VR user $40_{VR2}$.

In some but not necessarily all examples, in the first mode 121, the method 100 additionally enables: audio rendered to a VR user $40_{VR}$ to be rendered to non-VR users $40_{NVR}$ associated with that VR user $40_{VR}$. In the example illustrated, in the first mode 121, audio from the second VR user $40_{VR2}$ to be rendered to the first VR user $40_{VR1}$ is also rendered to the non-VR users $40_{NVR}$ associated with the first VR user $40_{VR1}$.

For example, the display 86 can have associated loudspeakers 246 that renders audio from the second VR user $40_{VR2}$ that is rendered to the first VR user $40_{VR1}$ via a head mounted device 280 to the non-VR user(s) $40_{NVR}$ through one or more loudspeakers. The non-VR user(s) $40_{NVR}$ can be in the same location as the first VR user $40_{VR1}$ or in a different location.

In some but not necessarily all examples, if a non-VR user is associated with a VR user $40_{VR}$ and is in the same room as that VR user $40_{VR}$, then audio from the associated VR user, for example first VR user $40_{VR1}$, to be rendered to another different VR user, for example second VR user $40_{VR2}$, need not be rendered via the loudspeaker 246 to the associated non-VR user $40_{NVR}$ because the associated non-VR user $40_{NVR}$ can overhear the associated VR user, for example the first VR user $40_{VR1}$. However, in this example or in other examples, where the non-VR user and associated VR user $40_{VR}$ are in different rooms/locations then audio from the associated VR user, for example the first VR user $40_{VR1}$, to be rendered to another different VR user, for example the second VR user $40_{VR2}$, can be rendered via the loudspeaker 246 to the associated non-VR user $40_{NVR}$.

In some but not necessarily all examples, audio from the associated non-VR user $40_{NVR}$ can be rendered (or not rendered) to the associated VR user $40_{VR}$. This may not be required if this communication direction is not enabled. This may not be required if this communication direction is enabled but the VR user $40_{VR}$ can overhear the associated non-VR user.

The following table summarizes examples of different communication scenarios for the first mode 121 when a non-VR user $40_{NVR}$ is associated with the first VR user $40_1$:

| render to | First VR user $40_{VR1}$ | Second VR user $40_{VR2}$ | non-VR user $40_{NVR}$ |
|---|---|---|---|
| First VR user $40_{VR1}$ | N/A | available | optional |
| Second VR user $40_{VR2}$ | available | N/A | optional |
| non-VR user $40_{NVR}$ | optional | PREVENTED | N/A |

The table illustrates if audio from a user in column 1 is rendered to a user identified in row 1. In this example, two-way audio communication 132 between the VR users is available. Audio communication from the non-VR user to the un-associated VR user is prevented. Depending on implementation, audio from the second VR user is optionally rendered to the non-VR user. In some circumstances, audio from the first VR user is optionally rendered to the associated non-VR user. In some circumstances, audio from the non-VR user is optionally rendered to the associated VR user.

The method 100 can be extended to enable, in the first mode 121, the first VR user $40_{VR1}$ and/or second VR user $40_{VR2}$ to control one or more of:
- whether or not audio from the second VR user $40_{VR2}$ is rendered to the first VR user $40_{VR1}$ and/or
- whether or not audio from the first VR user $40_{VR1}$ is rendered to the second VR user $40_{VR2}$ and/or
- whether or not audio from the second VR user $40_{VR2}$ is rendered to the one or more non-VR users $40_{NVR}$ and/or
- whether or not audio from the first VR user $40_{VR1}$ is rendered to the one or more non-VR users $40_{NVR}$ and/or
- whether or not audio from the one or more non-VR users $40_{NVR}$ is rendered to the first VR user $40_{VR1}$.

The following table summarizes examples of different communication scenarios for the second mode 122 when a non-VR user is associated with the first VR user $40_1$:

| | First VR user $40_{VR1}$ | Second VR user $40_{VR2}$ | NVR selected non-VR user $40_{NVR}$ | other non-VR user $40_{NVR}$ |
|---|---|---|---|---|
| First VR user $40_{VR1}$ | N/A | optional | optional | optional |
| Second VR user $40_{VR2}$ | optional | N/A | available | optional |
| selected non-VR user $40_{NVR}$ | optional | available | N/A | optional |
| other non-VR user $40_{NVR}$ | optional | optional | optional | N/A |

The table illustrates if audio from a user in column 1 is rendered to a user identified in row 1.

In some circumstances, the selected non-VR user $40_{NVR}$ and the other non-VR user $40_{NVR}$ are in the same room. In this circumstance, it is possible for audio to/from the selected non-VR user $40_{NVR}$ to also be audio to/from the other non-VR user $40_{NVR}$. However, in this circumstance, it can also be possible to use directional audio techniques so that audio to/from the selected non-VR user $40_{NVR}$ can be separated spatially from audio to/from the other non-VR user $40_{NVR}$.

Two-way audio communication 130 between the second VR user $40_{VR2}$ and the selected non-VR user $40_{NVR}$ is available.

Depending on implementation, audio from the first VR user is optionally rendered to the second VR user. Depending on implementation, audio from the second VR user is optionally rendered to the first VR user. That is all or a part or none of the original audio communication channel 132 can remain operational.

Depending on implementation, audio from the first VR user $40_{VR1}$ is optionally rendered to the selected non-VR user $40_{NVR}$. Depending on implementation, audio from the selected non-VR user $40_{NVR}$ is optionally rendered to the first VR user $40_{VR1}$.

Depending on implementation, audio from the first VR user $40_{VR1}$ is optionally rendered to the non-selected, other non-VR user $40_{NVR}$. Depending on implementation, audio from the non-selected, other non-VR user $40_{NVR}$ is optionally rendered to the first VR user $40_{VR1}$.

Depending on implementation, audio from the second VR user $40_{VR2}$ is optionally rendered to the other, non-selected, non-VR users $40_{NVR}$. Depending on implementation, audio from the other, non-selected, non-VR users $40_{VR2}$ is optionally rendered to the second VR user $40_{VR2}$.

Depending on implementation, audio from the selected non-VR users $40_{NVR}$ optionally rendered to the other, non-selected, non-VR users $40_{NVR}$. Depending on implementation, audio from the other, non-selected, non-VR users $40_{NVR}$ is optionally rendered to the selected non-VR user $40_{NVR}$.

It will be appreciated that different implementations enable the first VR user $40_{VR1}$ to be in a same of different room to the associated selected non-VR user $40_{NVR}$ and enable the associated selected non-VR user(s) $40_{NVR}$ to be in the same or different room to some or all of the associated non-selected, other non-VR user or users $40_{NVR}$. The second VR user $40_{VR2}$ is in a different room to the first VR user $40_{VR1}$ and the non-VR users $40_{NVR}$ associated with the first VR user $40_{VR1}$.

The method 100 can be extended to enable, in the second mode 122, the first VR user $40_{VR1}$ and/or second VR user $40_{VR2}$ to control one or more of:
- whether or not audio from the first VR user $40_{VR1}$ is rendered to the second VR user $40_{VR2}$ and/or non-VR users $40_{NVR}$
- whether or not audio from the second VR user $40_{VR2}$ is rendered to the first VR user $40_{VR1}$ and/or one or more non-VR users $40_{NVR}$ that are not a selected non-VR user;
- whether or not audio from the selected non-VR users $40_{NVR}$ is rendered to the first VR user $40_{VR1}$ and/or one or more non-VR users $40_{NVR}$ that are not a selected non-VR user;
- whether or not audio from the one or more non-VR users $40_{NVR}$ that are not a selected non-VR user is rendered to the other users.

FIG. 5 illustrates an example of a head mounted device 280 that is suitable for use by the first VR user $40_{VR1}$ or the second VR user $40_{VR2}$.

In the first mode 121, during two-way audio communication 132, audio from the second VR user $40_{VR2}$ is rendered to the first VR user $40_{VR1}$ via a head mounted device 280 and is rendered to the one or more non-VR users $40_{NVR}$ differently, for example by broadcast through loudspeakers 246 and audio from the first VR user $40_{VR1}$ is rendered to the second VR user $40_{VR2}$ via a different head mounted device 280 and, if rendered, is rendered to the one or more non-VR users $40_{NVR}$ differently, for example by broadcast through the loudspeakers 246. The loudspeakers 246 can occupy a real space shared with the first VR user $40_{VR1}$ and the one or more non-VR users $40_{NVR}$.

The head mounted device 280 comprises at least one display 282 for displaying a virtual visual scene 78 to a user wearing the head mounted device 280, position tracking hardware 284 for tracking a position of the head mounted device 280, audio output device(s) 286 such as head phones or ear pieces for providing audio output to a user wearing the head mounted device 280, a microphone 288 for recording audio input at least from a user wearing the head mounted device 280 and a controller 210. The position tracking hardware 284 at least tracks an orientation of the user's head, when they are wearing the head mounted device 280. This supports at least 3DoF. The position tracking hardware 284 in some examples additionally tracks displacement of the user's head, when they are wearing the head mounted device 280. This can support 3DoF+ and/or 6DoF.

The head mounted device 280 is an example of an VR apparatus 200 comprising means for: enabling a first virtual reality (VR) user, who is also a user of the VR apparatus 200, to control movement of a first virtual user $70_1$ in a virtual space 60, wherein a first point of view $42_1$ of the first VR user $40_{VR1}$ in a real space 50 controls at least part of a first virtual visual scene $78_1$ rendered to the first VR user $40_{VR1}$ and to one or more non-VR users $40_{NVR}$, wherein the one or more non-VR users $40_{NVR}$ are represented in the virtual space 60 by one or more, respective, separate virtual visual elements 110, wherein the one or more separate virtual visual elements 110 move, as a group, in the virtual space 60 with the first virtual user $70_1$;

enabling selection in the virtual space 60 of a virtual visual element representative of a non-VR user to select one of the one or more non-VR users $40_{NVR}$;

newly creating two-way audio communication 130 between the selected one of the one or more non-VR users $40_{NVR}$ and a second VR user $40_{VR2}$, in a second mode 122, by enabling audio from the second VR user $40_{VR2}$ to be rendered to at least the selected one of the one or more non-VR users $40_{NVR}$ and audio from at least the selected one of the one or more non-VR users $40_{NVR}$ to be newly rendered to the second VR user $40_{VR2}$.

FIG. 6 illustrates an example of a non-VR apparatus 250 for use by non-VR users.

The non-VR apparatus 250 comprises: a display 86 for displaying a virtual visual scene 78 controlled by another user, a VR user; tracking sensors 240 for tracking a non-VR user; optionally a camera 242 (which may be part of the tracking sensors 240) for capturing an image of the non-VR user; audio output device(s) 246 such as loudspeakers or head phones or ear pieces for providing audio output to one or more non-VR users; a microphone 244 for recording audio input at least from a non-VR user; and a controller 210.

FIG. 7A illustrates an example of a controller 210. Implementation of a controller 210 may be as controller circuitry. The controller 210 may be implemented in hardware alone, have certain aspects in software including firmware alone or can be a combination of hardware and software (including firmware).

As illustrated in FIG. 7A the controller 210 may be implemented using instructions that enable hardware functionality, for example, by using executable instructions of a computer program 222 in a general-purpose or special-purpose processor 212 that may be stored on a computer readable storage medium (disk, memory etc) to be executed by such a processor 212.

The processor 212 is configured to read from and write to the memory 220. The processor 212 may also comprise an output interface via which data and/or commands are output by the processor 212 and an input interface via which data and/or commands are input to the processor 212.

The memory 220 stores a computer program 222 comprising computer program instructions (computer program code) that controls the operation of the apparatus 200 when loaded into the processor 212. The computer program instructions, of the computer program 222, provide the logic and routines that enables the apparatus to perform the methods illustrated in the FIGs. The processor 212 by reading the memory 220 is able to load and execute the computer program 222.

The apparatus 200 therefore comprises:

at least one processor 212; and at least one memory 220 including computer program code the at least one memory 220 and the computer program code configured to, with the at least one processor 212, cause the apparatus 200 at least to perform:

enabling a first VR user $40_{VR1}$ and user of the apparatus to control movement of a first virtual user $70_1$ in a virtual space 60, wherein a first point-of-view $42_1$ of the first VR user $40_{VR1}$ in a real space 50 controls at least part of a first virtual visual scene $78_1$ rendered to the first VR user $40_{VR1}$ and to one or more non-VR users $40_{NVR}$;

wherein the one or more non-VR users $40_{NVR}$ are represented in the virtual space 60 by one or more, respective, separate virtual visual elements 110, wherein the one or more separate virtual visual elements 110 move, as a group 112, in the virtual space 60 with the first virtual user $70_1$, enabling selection in the virtual space 60 of a virtual visual element 110 representative of a non-VR user $40_{NVR}$ to select one of the one or more non-VR users $40_{NVR}$;

newly creating two-way audio communication 130 between the selected one of the one or more non-VR users $40_{NVR}$ and a second VR user $40_{VR2}$, in a second mode 122, by enabling audio from the second VR user $40_{VR2}$ to be rendered to at least the selected one of the one or more non-VR users $40_{NVR}$ and audio from at least the selected one of the one or more non-VR users $40_{NVR}$ to be newly rendered to the second VR user $40_{VR2}$.

As illustrated in FIG. 7B, the computer program 222 may arrive at the apparatus 200 via any suitable delivery mechanism 224. The delivery mechanism 224 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 222. The delivery mechanism may be a signal configured to reliably transfer the computer program 222. The apparatus 200 may propagate or transmit the computer program 222 as a computer data signal.

Computer program instructions for causing an apparatus to perform at least the following or for performing at least the following:

enabling a first VR user $40_{VR1}$ and user of the apparatus to control movement of a first virtual user $70_1$ in a virtual space 60, wherein a first point-of-view $42_1$ of the first VR user $40_{VR1}$ in a real space 50 controls at least part of a first virtual visual scene $78_1$ rendered to the first VR user $40_{VR1}$ and to one or more non-VR users $40_{NVR}$;

wherein the one or more non-VR users $40_{NVR}$ are represented in the virtual space 60 by one or more, respective, separate virtual visual elements 110, wherein the one or more separate virtual visual elements 110 move, as a group 112, in the virtual space 60 with the first virtual user $70_1$, enabling selection in the virtual space 60 of a virtual visual element 110 representative of a non-VR user $40_{NVR}$ to select one of the one or more non-VR users $40_{NVR}$;

newly creating two-way audio communication 130 between the selected one of the one or more non-VR users $40_{NVR}$ and a second VR user $40_{VR2}$, in a second mode 122, by enabling audio from the second VR user $40_{VR2}$ to be rendered to at least the selected one of the one or more non-VR users $40_{NVR}$ and audio from at least the selected one of the one or more non-VR users $40_{NVR}$ to be newly rendered to the second VR user $40_{VR2}$.

The computer program instructions may be comprised in a computer program, a non-transitory computer readable medium, a computer program product, a machine readable medium. In some but not necessarily all examples, the computer program instructions may be distributed over more than one computer program.

Although the memory 220 is illustrated as a single component/circuitry it may be implemented as one or more separate components/circuitry some or all of which may be integrated/removable and/or may provide permanent/semi-permanent/dynamic/cached storage.

Although the processor 212 is illustrated as a single component/circuitry it may be implemented as one or more separate components/circuitry some or all of which may be integrated/removable. The processor 212 may be a single core or multi-core processor.

Figure 8A:
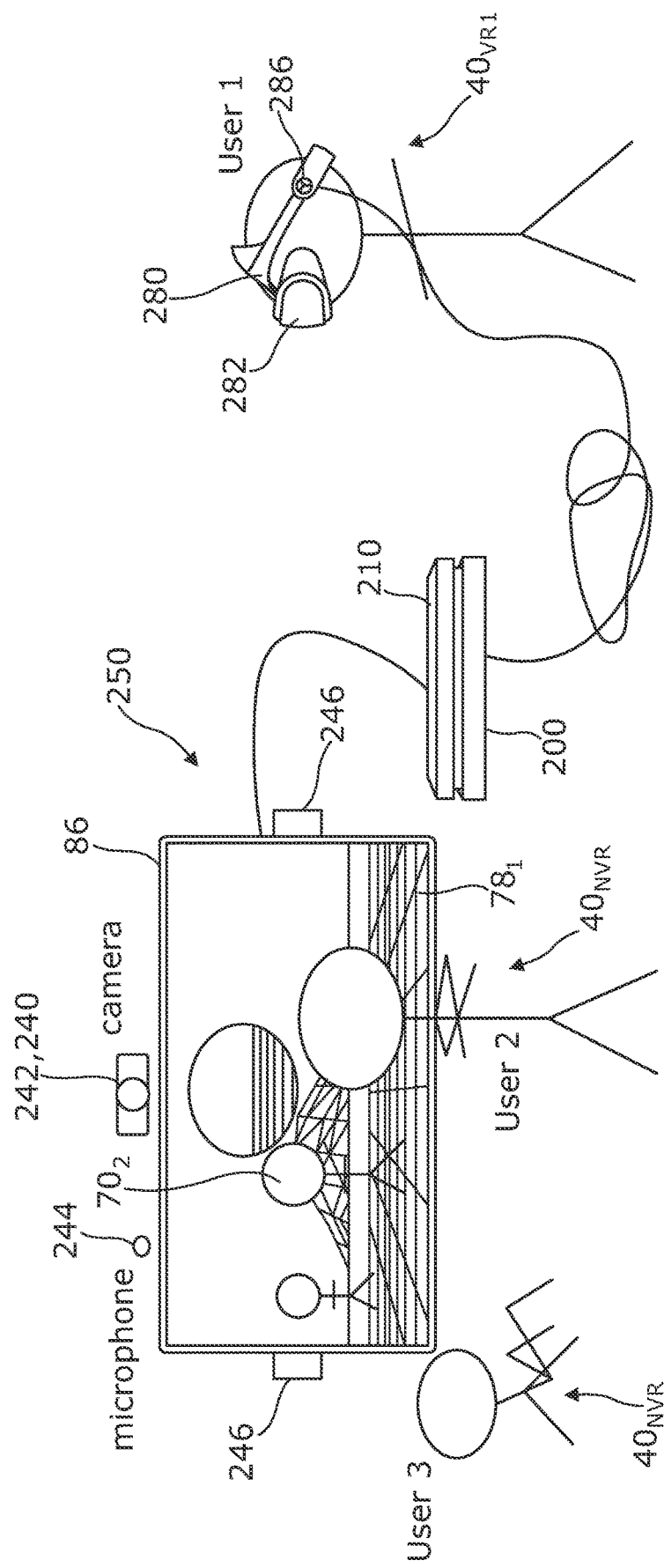
Figure 8B:
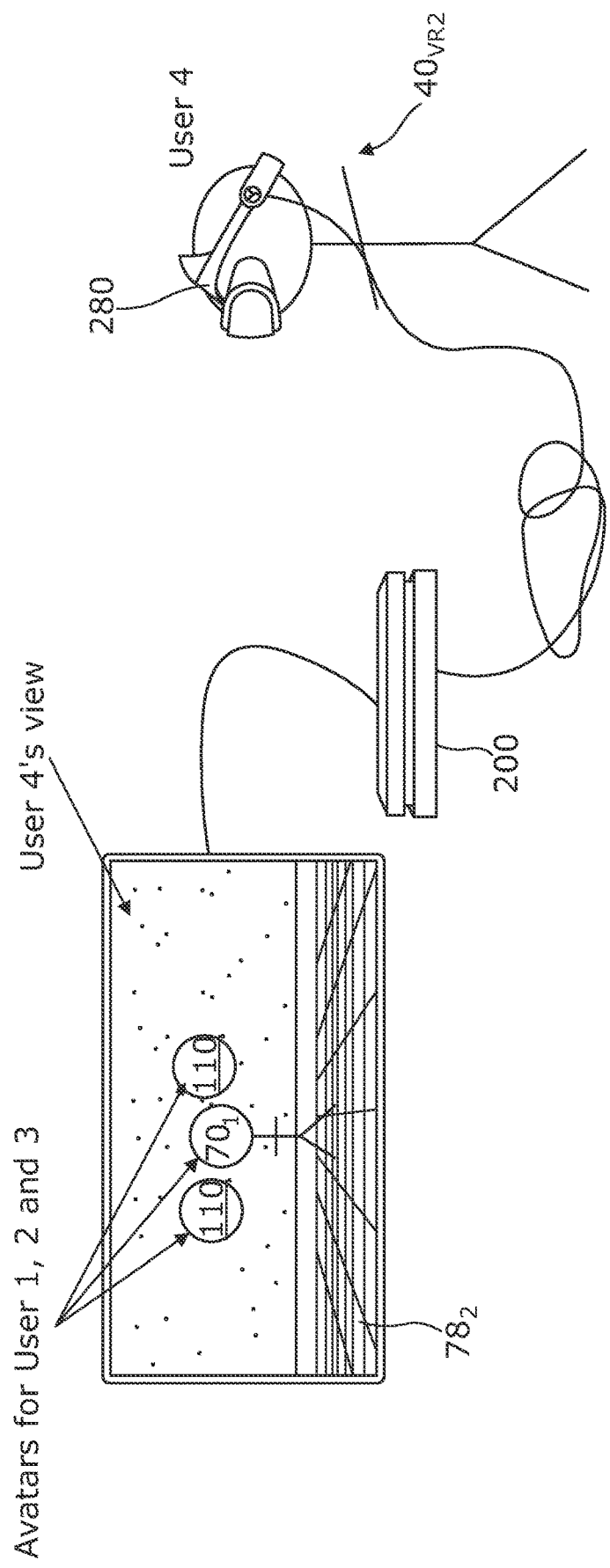
Figure 8C:
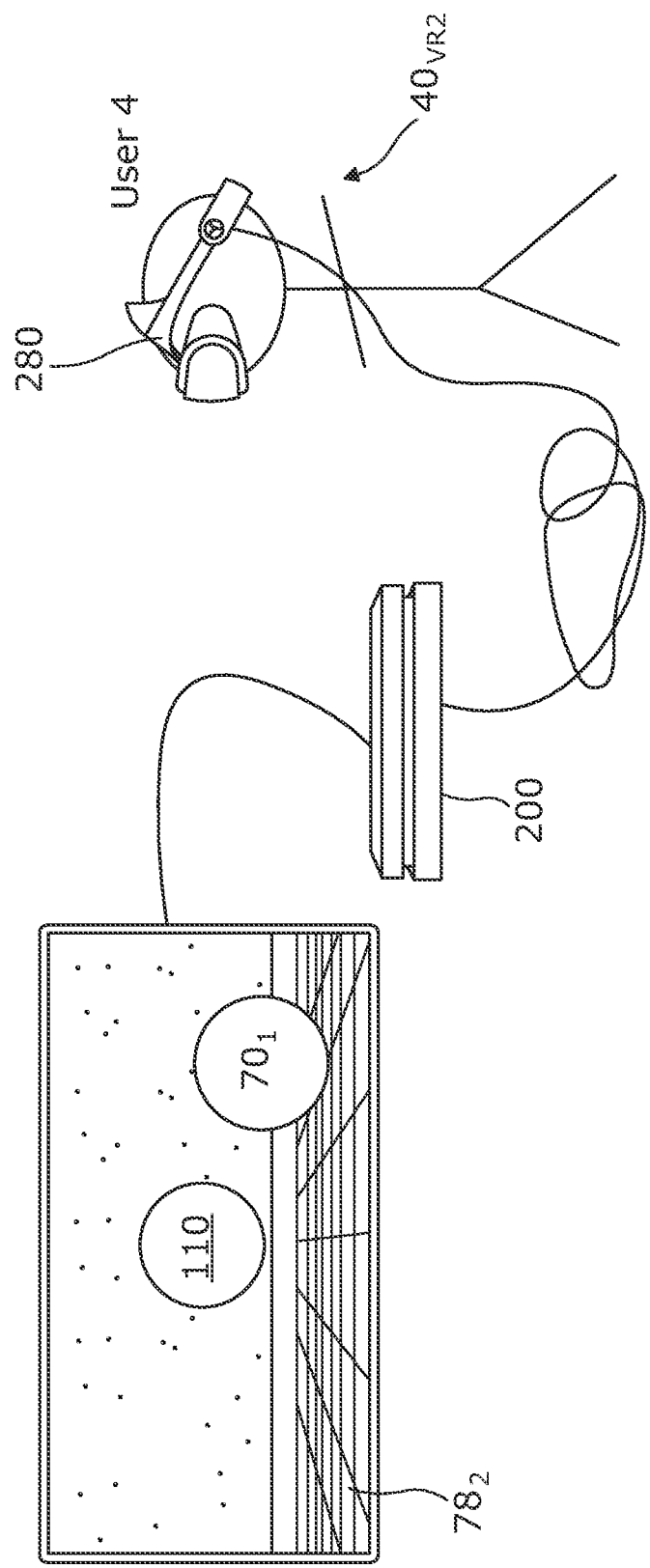
Figure 8D:
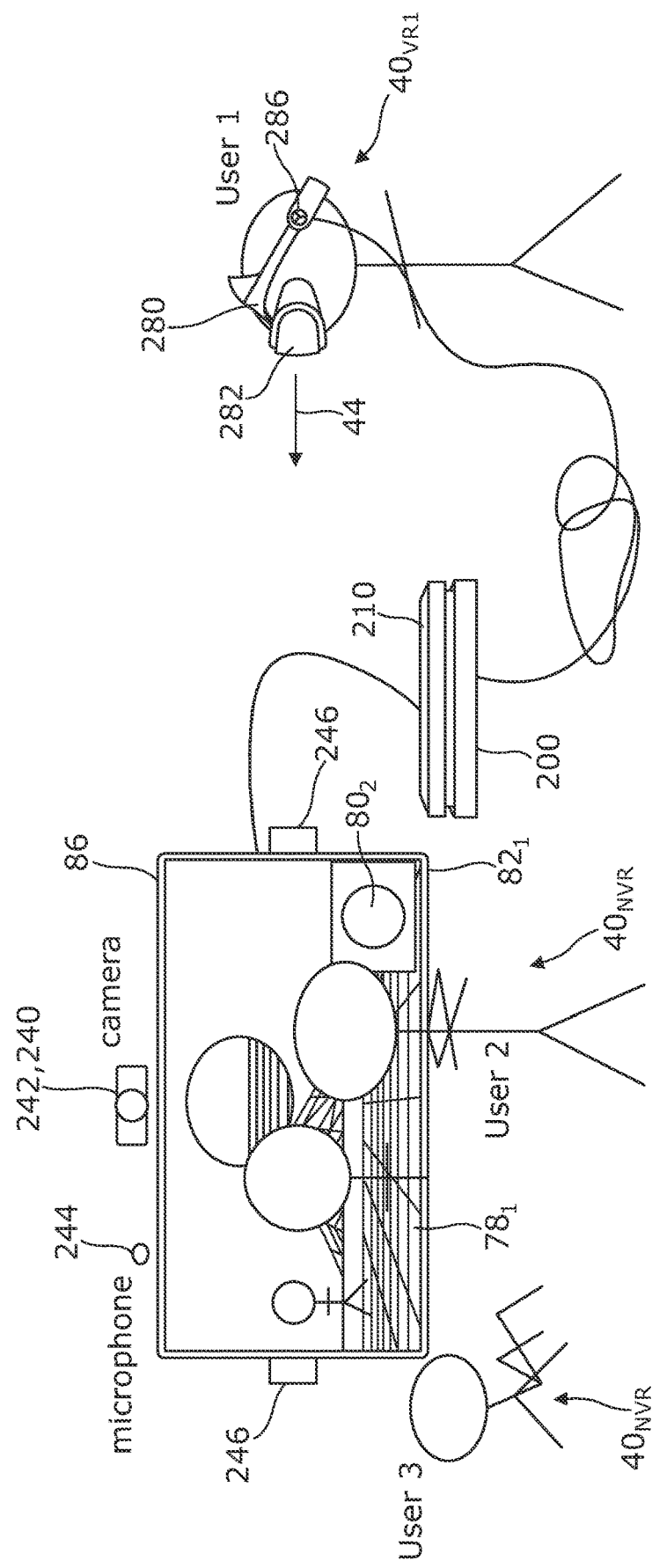
Figure 8E:
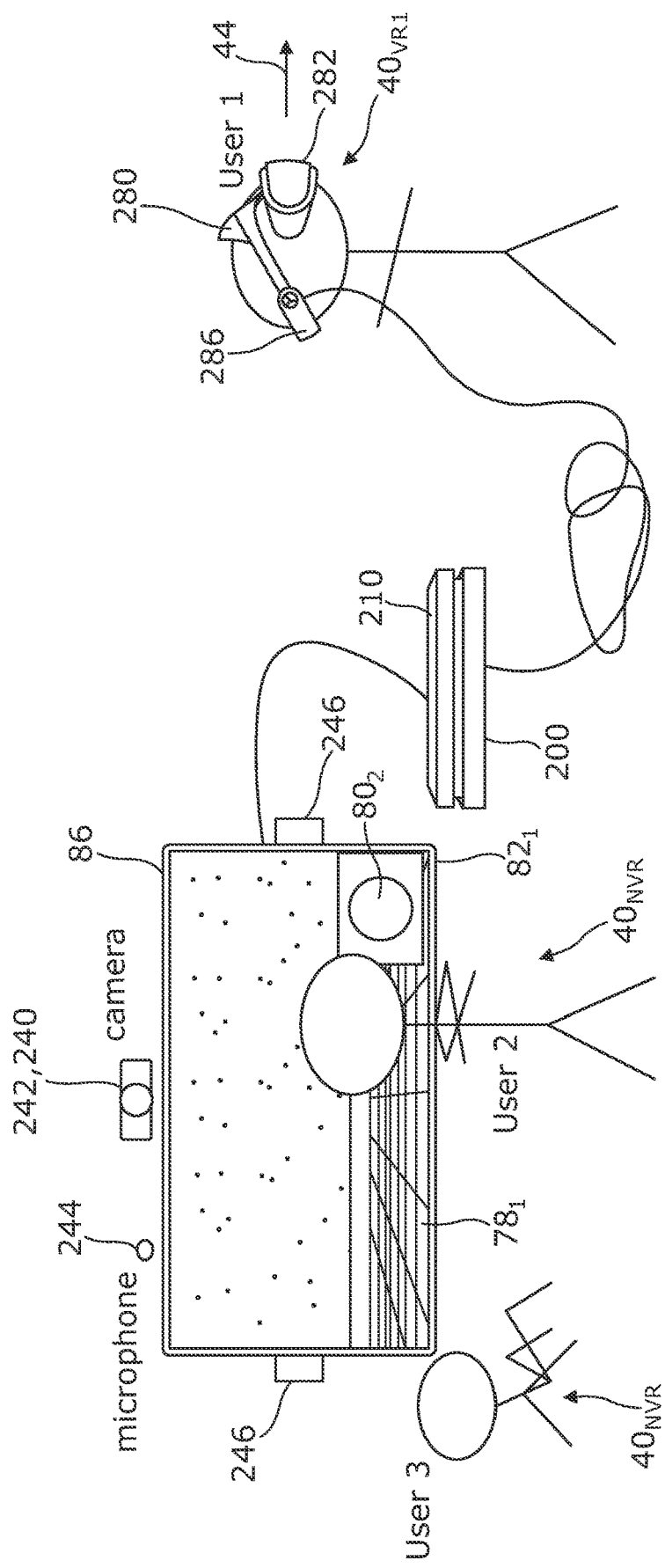

In the examples of FIGS. 8A to 8E, a first VR user $40_{VR1}$ is consuming virtual reality content via a head mounted device 280 (FIG. 8A, 8D, 8E). A remote second VR user $40_{VR2}$ is consuming virtual reality content via a head mounted device 280 contemporaneously (FIG. 8B, 8C). The first VR user $40_{VR1}$ and the second VR user $40_{VR2}$ are in the same virtual space, although not necessarily within the same virtual visual scenes 78. The viewport (the virtual visual scene 78) of the VR user 40 is shown in each FIG.

The first VR user $40_{VR1}$ is represented in a virtual visual scene 78 as a first virtual user $70_1$ (an avatar). The second VR user $40_{VR2}$ is represented in a virtual visual scene 78 as a second virtual user $70_2$ (an avatar).

In FIGS. 8A, 8D, 8E a viewport (the first virtual visual scene $78_1$) of the first VR user $40_{VR1}$ is duplicated on a display 86. Two non-VR users $40_{NVR}$ associated with the first VR user $40_{VR1}$ are watching the display 86 and what the first VR user $40_{VR1}$ is doing in the virtual space. The two non-VR users $40_{NVR}$ and the first VR user $40_{VR1}$ are in the same room.

A console is an example of an apparatus 200 comprising means for:
enabling a first virtual reality user $40_{VR1}$, who is also a user of the apparatus 200, to control movement of a first virtual user $70_1$ in a virtual space 60, wherein a first point of view $42_1$ of the first VR user $40_{VR1}$ in a real space 50 controls at least part of a first virtual visual scene $78_1$ rendered to the first VR user $40_{VR1}$ and to one or more non-VR users $40_{NVR}$, wherein the one or more non-VR users $40_{NVR}$ are represented in the virtual space 60 by one or more, respective, separate virtual visual elements 110, wherein the one or more separate virtual visual elements 110 move, as a group, in the virtual space 60 with the first virtual user $70_1$; enabling selection in the virtual space 60 of a virtual visual element representative of a non-VR user to select one of the one or more non-VR users $40_{NVR}$;
newly creating two-way audio communication 130 between the selected one of the one or more non-VR users $40_{NVR}$ and a second VR user $40_{VR2}$, in a second mode 122, by enabling audio from the second VR user $40_{VR2}$ to be rendered to at least the selected one of the one or more non-VR users $40_{NVR}$ and audio from at least the selected one of the one or more non-VR users $40_{NVR}$ to be newly rendered to the second VR user $40_{VR2}$.

FIGS. 8A and 8B illustrate a contemporaneous period of time during the first mode 121. FIG. 8C illustrates a transition from the first mode to the second mode. FIG. 8D illustrates the second mode. FIG. 8D illustrates the second mode at a later time.

In the first mode 121, in this example, any audio communication between the first VR user $40_{VR1}$ and the remote second VR user $40_{VR2}$ is heard by the non-VR users $40_{NVR}$, local to the room of the first VR user $40_{VR1}$, via loudspeakers 246 associated with the display 86.

The camera 242 can be used to detect persons in the room that are not consuming content via head mounted devices 280, i.e. that are not VR users.

In FIG. 8B a viewport (the second virtual visual scene $78_2$) of the second VR user $40_{VR2}$ comprises not only the first virtual user $70_1$ but also a group of virtual visual elements 110 representing the non-VR users $40_{NVR}$.

The virtual visual elements 110 can be avatars created from images of the non-VR users $40_{NVR}$ faces captured by the camera 242. The virtual visual elements 110 are grouped within a fixed distance of the first virtual user $70_1$ and move with (are carried with) the first virtual user $70_1$ in the second virtual visual scene $78_2$.

Referring to FIG. 8C, the second VR user $40_{VR2}$ wants to talk with a particular non-VR user $40_{NVR}$ represented by a particular virtual visual element 110 in the second virtual visual scene $78_2$. The second VR user $40_{VR2}$ controls the second virtual user $70_2$ to walk near to particular virtual visual element 110 in the second virtual visual scene $78_2$, look towards it and start talking to it. This switches the system to the second mode 122 and opens up a two-way communication link 130 between the
particular non-VR user $40_{NVR}$ and the second VR user $40_{VR2}$.

As illustrated in FIG. 8D, when the two-way communication link 130 between the particular non-VR user $40_{NVR}$ and the second VR user $40_{VR2}$ is operational, a picture-in-picture window $82_1$ is displayed on the display 86 within the image of the first virtual visual scene $78_1$. A visual representation $80_2$ of the second VR user $40_{VR2}$ or second virtual user $70_2$ is displayed within the picture-in-picture window $82_1$.

The visual representation $80_2$ of the second VR user $40_{VR2}$ or second virtual user $70_2$ is displayed within the picture-in-picture window $82_1$ while the two-way communication link 130 between the particular non-VR user $40_{NVR}$ and the second VR user $40_{VR2}$ is operational. The first virtual visual scene $78_1$ can change while the picture-in-picture window $82_1$ is displayed because it is controlled by the first point of view $42_1$ of the first VR user $40_{VR1}$. This is illustrated in FIG. 8E.

In some but not necessarily all examples, the picture-in-picture window $82_1$, is positioned so that it is located on a side of the display 86 closest to the selected particular non-VR user $40_{NVR}$. In the examples of FIGS. 8D and 8E, the selected non-VR user $40_{NVR}$ is user 2.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

In at least some examples there can be provided an apparatus 200 comprising means for: enabling a first VR user $40_{VR1}$ (e.g. local) to control movement of a first virtual user $70_1$ in a virtual space 60, wherein
a first point of view $42_1$ of the first VR user $40_{VR1}$ in a real space 50 controls at least part of a first virtual visual scene $78_1$ rendered to the first VR user $40_{VR1}$ and to one or more non-VR users $40_{NVR}$ (e.g. local)
enabling a second VR user $40_{VR2}$ (e.g. remote) to control movement of a second virtual user $70_2$ in the virtual space 60, wherein a second point of view $42_2$ of the second VR user $40_{VR2}$ in real space 50 controls at least part of a second virtual visual scene $78_2$ rendered at least to the second VR user $40_{VR2}$,
wherein the one or more non-VR users $40_{NVR}$ (local) are represented in the virtual space 60 by one or more, respective, separate virtual visual elements 110 (e.g. avatars), wherein the one or more separate virtual visual elements 110 move, as a group, in the virtual space 60 with the first virtual user $70_1$,
wherein the first point of view $42_1$ of the first VR user $40_{VR1}$ can control at least part of the first virtual visual scene $78_1$ rendered to the first VR user $40_{VR1}$ and to the one or more non-VR users $40_{NVR}$ (e.g. local) to comprise the second virtual user $70_2$, and
wherein the second point of view $42_2$ of the second VR user $40_{VR2}$ can control at least part of the second virtual visual scene $78_2$ rendered to the second VR user $40_{VR2}$ to comprise the first virtual user $70_1$ and the one or more virtual visual elements 110,
enabling in a first mode 121 (e.g. VR to VR; NVR listen) audio from the first VR user $40_{VR1}$ to be rendered to the second VR user $40_{VR2}$,
audio from the second VR user $40_{VR2}$ to be rendered to the first VR user $40_{VR1}$ and to be rendered to the one or more non-VR users $40_{NVR}$, and
audio from the one or more non-VR users $40_{NVR}$ not to be rendered to the second VR user $40_{VR2}$; and
enabling the second virtual user $70_2$ to select in the rendered second virtual visual scene $78_2$ a virtual visual element representative of a non-VR user to select the non-VR user enabling in a second mode 122 (e.g. VR to NVR)
audio from the second VR user $40_{VR2}$ to be rendered to at least the selected one of the one or more non-VR users $40_{NVR}$ and
audio from at least the selected one of the one or more non-VR users $40_{NVR}$ to be rendered to the second VR user $40_{VR2}$,
newly enabling two-way audio communication 130 between the selected one of the one or more non-VR users $40_{NVR}$ and the second VR user.

The FIGs may represent steps in a method and/or sections of code in the computer program 222. The illustration of a particular order does not necessarily imply that there is a required or preferred order and the order and arrangement may be varied. Furthermore, it may be possible for some steps to be omitted.

Where a structural feature has been described, it may be replaced by means for performing one or more of the functions of the structural feature whether that function or those functions are explicitly or implicitly described.

The above described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
   at least one processor; and
   at least one memory including computer program code, the at least one memory and the computer program code configured to, with the at least one processor, cause the apparatus to perform at least the following:
   enable a first virtual reality user and user of the apparatus to control movement of a first virtual user in a virtual space, wherein a first point-of-view of the first virtual reality user in a real space controls at least part of a first virtual visual scene rendered to the first virtual reality user and to one or more non virtual reality users, wherein the one or more non virtual reality users are represented in the virtual space by one or more, respective, separate virtual visual elements, wherein the one or more separate virtual visual elements move, as a group, in the virtual space with the first virtual user;
   enable selection in the virtual space of a virtual visual element representative of a non virtual reality user to select one of the one or more non virtual reality users; and
   newly create two-way audio communication between the selected one of the one or more non virtual reality users and a second virtual reality user by enabling audio from the second virtual reality user to be rendered to at least the selected one of the one or more non virtual reality users and audio from at least the selected one of the one or more non virtual reality users to be newly rendered to the second virtual reality user, wherein at least one of the first virtual reality user or the second virtual reality user is able to control one or more of:
   (a) whether or not audio from the second virtual reality user is rendered to the first virtual reality user;
   (b) whether or not audio from the second virtual reality user is rendered to the one or more non virtual reality users;
   (c) whether or not audio from the first virtual reality user is rendered to the second virtual reality user;
   (d) whether or not audio from the first virtual reality user is rendered to the one or more non virtual reality users; or
   (e) whether or not audio from the one or more non virtual reality users is rendered to the first virtual reality user.

2. The apparatus as claimed in claim 1, further configured to enable the second virtual reality user to control movement of the second virtual user in the virtual space, wherein a second point-of-view of the second virtual reality user in real space controls at least part of a second virtual visual scene rendered at least to the second virtual reality user.

3. The apparatus as claimed in claim 1, further configured to enable two-way visual communication between the selected one of the one or more non virtual reality users and the second virtual reality user by displaying a visual representation of the second virtual reality user or second virtual user within a window within the first virtual visual scene, the first visual scene being controlled at least in part by a first point-of-view of the first virtual reality user, and by displaying a visual representation of the selected non virtual reality user within a window within the second virtual visual scene, the second visual scene being controlled at least in part by a second point-of-view of the second virtual reality user.

4. The apparatus as claimed in claim 1, wherein the one or more separate virtual visual elements are avatars of the respective one or more non virtual reality users and are visually distinct compared to virtual users.

5. The apparatus as claimed in claim 1, wherein selection in the virtual space of the virtual visual element representative of a non virtual reality user switches a mode of the apparatus from a first mode to the second mode, wherein in the first mode, audio from the one or more non virtual reality users is not rendered to the second virtual reality user.

6. The apparatus as claimed in claim 5, further configured to, in the first mode, enable audio from the first virtual reality user to be rendered to the second virtual reality user; and audio from the second virtual reality user to be rendered to the first virtual reality user and to be rendered to the one or more non virtual reality users.

7. The apparatus as claimed in claim 5, further configured to enable, in the first mode, two-way audio communication between the first virtual reality user and the second virtual reality user while preventing audio communication from any of the one of the one or more non virtual reality users to the second virtual reality user.

8. The apparatus as claimed in claim 1 further configured to enable the second virtual user to move towards or move close to, in the rendered second virtual visual scene, a virtual visual element representative of a non virtual reality user as a necessary but not necessarily sufficient condition for selecting the non virtual reality user.

9. The apparatus as claimed in claim 1, wherein audio from the second virtual reality user is rendered to the first virtual reality user via a head mounted device and is rendered to the one or more non virtual reality users differently and audio from the first virtual reality user is rendered to the second virtual reality user via a head mounted device and is rendered to the one or more non virtual reality users differently.

10. The apparatus as claimed in claim 1, wherein audio from the second virtual reality user is rendered to the first virtual reality user via a head mounted device and is rendered to the one or more non virtual reality users by broadcast via one or more loudspeakers in a real space shared by the first virtual reality user and the one or more non virtual reality users.

11. The apparatus as claimed in claim 1, wherein the non virtual reality users does not control a virtual user in the virtual space and wherein the one or more separate virtual visual elements are not moveable in the virtual space by the respective one or more non virtual reality users.

12. A method comprising:
enabling a first virtual reality user to control movement of the first virtual user in a virtual space, wherein a first point-of-view of the first virtual reality user in a real space controls at least part of a first virtual visual scene rendered to the first virtual reality user and to one or more non virtual reality users wherein the one or more non virtual reality users are represented in the virtual space by one or more, respective, separate virtual visual elements, wherein the one or more separate virtual visual elements move, as a group, in the virtual space with the first virtual user,
enabling selection in the virtual space of a virtual visual element representative of a non virtual reality user to select one of the one or more non virtual reality users;
newly creating two-way audio communication between the selected one of the one or more non virtual reality users and a second virtual reality user by enabling audio from the second virtual reality user to be rendered to at least the selected one of the one or more non virtual reality users and audio from at least the selected one of the one or more non virtual reality users to be newly rendered to the second virtual reality user, wherein at least one of the first virtual reality user or the second virtual reality user is able to control one or more of:
 (a) whether or not audio from the second virtual reality user is rendered to the first virtual reality user;
 (b) whether or not audio from the second virtual reality user is rendered to the one or more non virtual reality users;
 (c) whether or not audio from the first virtual reality user is rendered to the second virtual reality user;
 (d) whether or not audio from the first virtual reality user is rendered to the one or more non virtual reality users; or
 (e) whether or not audio from the one or more non virtual reality users is rendered to the first virtual reality user.

13. The method as claimed in claim 12, further comprising enabling a second virtual reality user to control movement of a second virtual user in the virtual space, wherein a second point-of-view of the second virtual reality user in real space controls at least part of a second virtual visual scene rendered at least to the second virtual reality user.

14. The method as claimed in claim 12, further comprising enabling two-way visual communication between the selected one of the one or more non virtual reality users and the second virtual reality user by displaying a visual representation of the second virtual reality user or second virtual user within a window within the first virtual visual scene, the first visual scene being controlled at least in part by a first point-of-view of the first virtual reality user, and by displaying a visual representation of the selected non virtual reality user within a window within the second virtual visual scene, the second visual scene being controlled at least in part by a second point-of-view of the second virtual reality user.

15. The method as claimed in claim 12, wherein the one or more separate virtual visual elements are avatars of the respective one or more non virtual reality users and are visually distinct compared to virtual users.

16. The method as claimed in claim 12, wherein selection in the virtual space of the virtual visual element representative of a non virtual reality user switches a mode of the apparatus from a first mode to the second mode, wherein in the first mode, audio from the one or more non virtual reality users is not rendered to the second virtual reality user.

17. The method as claimed in claim 16, further comprising, in the first mode, enabling audio from the first virtual reality user to be rendered to the second virtual reality user; and audio from the second virtual reality user to be rendered to the first virtual reality user and to be rendered to the one or more non virtual reality users.

18. A non-transitory computer readable medium comprising program instructions stored thereon for performing at least the following:
enable a first virtual reality user to control movement of the first virtual user in a virtual space, wherein a first point-of-view of the first virtual reality user in a real space controls at least part of a first virtual visual scene rendered to the first virtual reality user and to one or more non virtual reality users, wherein the one or more non virtual reality users are represented in the virtual space by one or more, respective, separate virtual visual elements, wherein the one or more separate virtual visual elements move, as a group, in the virtual space with the first virtual user;
enable selection in the virtual space of a virtual visual element representative of a non virtual reality user to select one of the one or more non virtual reality users; and
newly create two-way audio communication between the selected one of the one or more non virtual reality users and a second virtual reality user by enabling audio from the second virtual reality user to be rendered to at least the selected one of the one or more non virtual reality users and audio from at least the selected one of the one or more non virtual reality users to be newly rendered to the second virtual reality user, wherein at least one of the first virtual reality user or the second virtual reality user is able to control one or more of:
 (a) whether or not audio from the second virtual reality user is rendered to the first virtual reality user;
 (b) whether or not audio from the second virtual reality user is rendered to the one or more non virtual reality users;
 (c) whether or not audio from the first virtual reality user is rendered to the second virtual reality user;
 (d) whether or not audio from the first virtual reality user is rendered to the one or more non virtual reality users; or (e) whether or not audio from the one or more non virtual reality users is rendered to the first virtual reality user.

\* \* \* \* \*